United States Patent Office 3,267,143
Patented August 16, 1966

3,267,143
PROCESS FOR OBTAINING ALPHA-CHLORO-OXIMES AND SULPHATES THEREOF
Adriano Nenz, Corrado Brichta, Giuseppe Ribaldone, and Gianpiero Borsotti, Milan, Italy, assignors, by mesne assignments, to Edison, Milan, Italy, a corporation of Italy
No Drawing. Filed Feb. 1, 1963, Ser. No. 257,357
Claims priority, application Italy, Feb. 3, 1962, 665,304; Sept. 20, 1962, 674,765
12 Claims. (Cl. 260—566)

This invention relates to a process for obtaining alpha chloro-oximes and sulphates thereof, and more particularly it rates to a process by which alpha chloro-aldoximes, and alpha chloroketoximes, as well as their sulphate salts, can be directly obtained, starting from compounds containing a double or olefinic bond.

As already known, the alpha chloro-oximes in general, are usually obtained by causing alpha chloro-carbonyl compounds, and in particular alpha chloro-aldehydes and alpha chloro-ketones, to react with hydroxylamine or its salts. A drawback of such method consists in the difficulties encountered in the separation of the pure alpha-chloro-oximes from the related reaction mixtures.

It is also known that alpha-chloro-oximes can be obtained by the addition of nitrosyl chloride to olefinic compounds, whereby however many undesirable byproducts are also formed.

According to an already known, improved method, by the use of nitrosyl chloride, in the presence of anhydrous hydrochloric acid, a mixture of products is obtained, with not always satisfactory yields, owing to simultaneous formation of a few byproducts, amongst which the dimer of chloronitrous derivative.

Moreover, the above method requires the use of nitrosyl chloride, i.e. of a gaseous product which is difficult to handle.

An object of this invention is therefore the provision of a process for making alpha-chloro-oximes with high yields, or at any rate yields higher than those that may be attained by the heretofore known methods.

Another purpose of this invention is the provision of a readily practicable process for the production of high purity alpha-chloro-oximes.

A further object of the invention is the provision of a process by which alpha-chloro-oximes can be obtained starting from readily and abundantly available raw materials.

Yet another object of this invention is the provision of a method for obtaining sulphate salts of alpha-chloro-oximes, and in particular of the alpha-chlorocyclohexanone oxime sulphate—a new intermediate which is very important for the production of the alpha-chlorocyclohexanone oxime, as well as for further organic syntheses.

Many advantages can be obtained by the method according to this invention, when compared with the above described processes for the production of alpha-chloro-oximes. Amongst them, it might be quoted, e.g.: higher yields, utilisation of a readily available and easily manipulated nitrosing agent, since the nitrosylsulphuric acid is a crystalline product which is stable at room temperature, contrary to gaseous nitrosyl chloride; absence of particular requirements as regard to temperature, pressure and all other conditions under which the reaction is carried out; easy separation of required products.

By the process according to this invention the alpha-chloro-oximes are obtained by causing the nitrosylsulphuric acid to react, in the presence of anhydrous hydrochloric acid, with organic compounds containing a double bond of olefinic nature, and having at least one hydrogen atom directly bound with one of carbon atoms that bear the double bond, or with a solution of same compounds in inert solvents. Again according to this invention, the alpha-chloro-oximes can be isolated or separated—after hydrolysis of their sulphates thus obtained—by any one of the already known methods, e.g. by decantation, filtration, extraction with solvents and the like.

The process according to this invention may be schematized as follows:

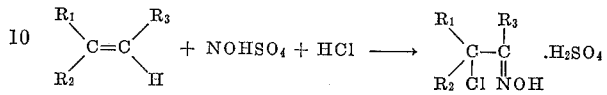

where $R_1$, $R_2$ and $R_3$ are hydrogen atoms, alkyl-, cycloalkyl-, aryl-alkyl- or aryl-radicals; or where $R_1$ and $R_2$, or $R_1$ and $R_3$ represent elements of the same ring, which is closed by methylene groups to form a cyclo-aliphatic ring having from 4 to 12 carbon atoms.

The process according to this invention can be applied to all organic compounds containing at least one double bond of olefinic nature, and having at least one hydrogen atom directly linked with a carbon atom having the double bond. It may therefore be applied to olefines, cycloolefines and aryl-substituted olefines, as well as to their substitution products. As examples of such compounds, there may be listed: ethylene, propylene, oligomers of propylene, butene (1), butene (2) isobutene, pentenes, hexenes, heptenes etc., cyclo-pentene, cyclo-hexene, methylene-cyclohexane, limonene, methylcyclohexene, cyclo-dodecene, styrene, cyclo-octene and the like.

In the case of cyclo-hexene, the possibility exists to use a mixture of such cyclo-olefine and cyclo-hexane, as it is obtained, e.g., by the method according to the commonly assigned U.S. patent application No. 208,923, filed July 10, 1962, thereby attaining a material saving and simplification of the method for the production of alpha-chloro-cyclohexanone oxime, by starting from cyclohexane.

In carrying the above stated method into practice, the hereinafter stated general procedure is followed: olefine (pure or diluted in a solvent) and nitrosylsulphuric acid are put into the reaction vessel; then, while stirring, anhydrous hydrochloric acid, is introduced into the vessel.

The addition of nitrosylsulphuric acid may be also made little by little, by the use of any device suitable for adjusting the feed thereof, while simultaneously gaseous hydrogen chloride is bubbled through the reaction mixture.

The nitrosylsulphuric acid is caused to react in substantially equimolecular amounts with the compound containing the double olefinic bond, and in the presence of at least one mole of hydrogen chloride anhydrous, per mole of olefinic compound. However, the reaction may be carried out even in the presence of an excess of hydrogen chloride anhydrous, and of the olefinic compound, or in the presence of an excess only of hydrogen chloride anhydrous or only of the olefinic compound, over the nitrosylsulphuric acid.

The hydrogen chloride anhydrous may be also formed in situ, e.g. by reacting sulphuric acid with an alkali chloride.

In the latter case, the nitrosylsulphuric acid is dissolved in sulphuric acid (molar ratio 1:1); and the resulting solution is added to a suspension of an alkali chloride in the olefine.

The reaction between olefine and nitrosylsulphuric acid is preferably conducted in the presence of solvents which are inert in respect to nitrosyl sulphate, and wherein the reaction product, i.e. the sulphate of alpha-chloro-oxime may be either soluble or insoluble.

The solvents for olefine, wherein the alpha-chloro oxime sulphate is soluble are: acetic acid, propionic acid, nitrobenzene, methylene chloride, liquid sulfurous anhydride etc.

The solvents for olefine, wherein the alpha-chloro oxime sulphate is insoluble are: aliphatic and cycloaliphatic hydrocarbons, e.g., hexane and cyclohexane, or alkylenic hydrocarbons, as the olefine itself in excess; aromatic hydrocarbons, as benzene and toluene; and some chlorinated hydrocarbons, as carbon tetrachloride, and the like.

Though the method according to this invention may be carried into practice even in the absence of solvents, the use of solvents is preferred, since they allow a more ready control of reaction temperature, and promote a smoother reaction.

The reaction temperature may range within wide limits; thus good results have been obtained at temperatures ranging from −30° C. to +30° C., although the temperature preferably is around 0° C.

In the above temperature interval, a sufficiently high reaction rate is attained, and the reaction can be considered as completed within 60–90 minutes.

The end of reaction can be readily ascertained, on the basis of disappearance of the reaction of $NO^+$ ion on the iodine-starch paper.

The reaction may also be carried out under pressure, in an autoclave filled with the anhydrous hydrogen chloride, and the olefine, in the required proportions, in the presence or in the absence of a solvent, with the nitrosyl sulphate being continuously fed into same autoclave by means of a suitable metering feeder.

When the reaction is conducted in the presence of a solvent for one or more reactants, but in which the alpha-chloro-oxime sulphate is not soluble, said sulphate is separated, as soon as it is formed, in the form of a whitish viscous oil, which after the reaction end can be isolated by merely decanting it from the liquid organic phase. When, instead, the reaction is carried out in a solvent in which the alpha-chloro-oxime sulphate is soluble, the sulphate can be precipitated from the solvent, after the end of reaction, by the addition of a suitable diluent, as e.g. benzene, carbon tetrachloride or petroleum ether, or can be isolated by vacuum distillation of the solvent used in the reaction.

The alpha-chloro-oxime sulphate, obtained as stated above, can be then converted into the arpha-chloro-oxime by cool hydrolysis. The alpha-chloro-oximes thus obtained are ordinarily plactically insoluble in water whereby they can be separated as a liquid or solid phase. The alpha-chloro oxime can be obtained by filtration or extraction with a suitable solvent, e.g. methylene chloride, chloroform, benzene and the like, and can be further purified by crystallization or distillation.

The hydrolysis, designed to free the alpha-chloro-oxime from the corresponding sulphate, may be carried out on the sulphate of the alpha-chloro-oxime previously isolated from the reaction mass, or preferably on the whole reaction mixture as such. The preference is to be given to the latter procedure when the alpha-chloro-oxime sulphate is soluble in the solevnt used for the reaction.

A particularly advantageous variant consists in the use of a solvent wherein both alpha-chloro-oxime sulfate, and the free alpha-chloro-oxime are soluble, and that, at the same time, is not miscible with water. Thus, for instance, the use of methylene chloride has proved to be specially advantageous. In such a case, when the reaction mixture wherein the alpha-chloro-oxime sulphate is dissolved, is poured into cold water, a separation occurs of a layer of solvent wherein the free alpha-chloro oxime is dissolved. The aqueous layer is removed by decantation, and the free alpha-chloro-oxime can be recovered from the chloromethylene layer.

According to a theory, which however should not be considered as restrictive in respect to this invention, the formation of the alpha-chloro-oxime is believed to follow an ionic mechanism, with the participation of the ions $NO^+$ and $Cl^-$, respectively coming from the nitrosylsulphuric acid, and from the anhydrous hydrochloric acid.

According to the above mechanism, the cation $NO^+$ is firstly added to double bond of olefinic compound, to form a positively charged ion (carbonium ion with cationic carbon atom).

Then, the cation carbon, by capturing the anion $Cl^-$, would give rise to the formation of the alpha-chloro-oxime.

The following examples of the embodiments of this invention are given as illustrative examples only, and they are not at all intended to be restrictive of the scopes thereof.

*Example 1*

50 g. of cyclohexene (0.61 mole) and 150 g. of cyclohexane were put into a 500 cc. round-bottom flask, fitted with a refflux cooler, a stirrer, a thermometer, an outer cooling bath, and formed with two separate inlets for HCl and nitrosyl sulphate. After having cooled the cyclohexane-cyclohexene mixture down to 0° C., the feed of nitrosyl sulphate—subdivided into minute crystals—was started with the aid of a metering means for solids, and at the same time, a small current of HCl—metered in such a manner that a slight excess of HCl over the nitrosyl sulphate was always present—was also fed to the flask.

Thus, 60 g. of $NOHSO_4$ (0.47 mole) and about 20 g. of HCl (about 0.55 mole) were added within about 90 minutes to the flask contents.

A whitish viscous oil separated in the course of the rereaction, which is slightly exothermic. After the addition of both reactants, the reaction mixture was vigorously stirred for further 30 minutes, while maintaining the temperature at about 0° C. At the end of such operation, the nonreacted cyclohexane and cyclohexene were removed by simply decanting them. Thus, the entire amount of cyclohexane, and 12.1 g. of cyclohexene, as determined by titration with bromine of the cyclohexane-cyclohexene mixture, were recovered.

After having removed the last traces of cyclohexane and cyclohexene by suction, 113.5 g. of product were obtained. The elemental analysis of such product, as compared with the theoretical analysis of alpha-chloro-cyclohexanone oxime sulphate, was as follows—

Found: C, 29.3%; H, 5.1%; N, 5.4% S, 12.5%; Cl, 14.0%. Theoretical: C, 29.3%; H, 4.9% N, 5.7%; S, 13.0%; Cl, 14.5%.

Such product which, owing to its highly hygroscopic nature, can be hardly isolated in its solid and crystalline condition, appeared as an opalescent, oily liquid, having a refractive index $n_D^{30}=1.5070$, and a density $40/40=1.504$. It is insoluble in solvents as e.g. aliphatic and cycloaliphate hydrocarbons (petroleum ether, hexane, cyclohexane cyclohexene etc.), aromatic hydrocarbons (benzene, toluene etc.) and carbon tetrachloride, and soluble in solvents as e.g. methyl and ethyl alcohol, dioxane, acetone, acetic and propionic acids, nitrobenzene, methylene chloride and liquid sulphurous anhydride.

The chemical composition of the alpha-chlorocyclohexanone oxime sulphate was moreover confirmed by the titration of sulphuric acid linked to alpha-chloro-cyclohexanone oxime.

The yield of cyclohexanone oxime sulphate, based on the nitrosylsulphuric acid, was of 98%, and based on converted cyclohexene was of 99.5%.

The product obtained as stated before was compared with that obtained by dissolving 2 g. of pure alpha-chloro-cyclohexanone oxime in 20 cc. of cyclohexane, and adding to resulting solution, kept at 0° C. and stirred, 1.328 g. of 100% $H_2SO_4$. Even in this latter case, the separation of a whitish oil product took place. Such product was set free from the cyclohexane firstly by decantation, and then by a prolonged vacuum treatment until constant weight. 2.28 g. of a compound, having the hereinafter stated elemental analysis were thus obtained.

C=30.9%, H=5.2%, N=5.7%, S=12.2% and Cl=14.3%.

Such compounds correspond therefore to the formula:

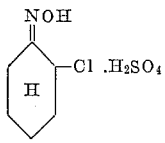

The refractive index is $n_D^{30}=1.5057$.

The I.R. spectrum of the product prepared in the above manner appeared identical to that of the product obtained according to method that is stated in the first part of the example.

The I.R spectrum of both products showed three wide bands, with absorption maxima at 8.6μ, 9.6μ, 11.3μ, which correspond to those known from the literature as peculiar features of the grouping $HSO_4^-$ (Miller Wilkins, Anal. Chem., Nr. 24, p. 1253 (1952)).

200 cc. of $H_2O$ and 100 g. of comminuted ice were added to said 113.5 g. of alpha-chlorocyclohexanone oxime sulphate. A liquid, oily substance was thereby obtained as an upper layer. Such substance solidified itself, within a short time, taken the form of white crystals. It was found convenient to have the organic phase, yet in the liquid condition, extracted with $CH_2Cl_2$, thereby obtaining the solid product after the evaporation of solvent. 64.3 g. of alpha-chloro-cyclohexanone oxime, M.P. 73°–75° C., and having an elemental analysis as stated below, were thus obtained.

Found: C, 49.1%; H, 6.5%; Cl, 23.7%; N, 9.65%.
Theoretical: C, 48.8%; H, 6.77%; Cl, 24.05%; N, 9.5%.

The yield of alpha-chloro-cyclohexanone oxime, based on nitrosyl sulphate and on converted cyclohexene respectively was of 92.3% and of 94.6%. The product, crystallized once from petroleum ether had an M.P. 79°–80°C.

*Example 2*

A procedure similar to that of Example 1 was followed, by dissolving 50 g. of cyclohexene in 150 g. of $CCl_4$, in a 250 cc. round-bottom flask. Then, 60 g. of $NOHSO_4$ were added in the course of 90 minutes, and simultaneously dry HCl (total about 20 g.) was bubbled through the reaction mixture, kept at about 0° C. Under such conditions, a product is the form of a viscous oil, floating on the carbon tetrachloride, was obtained. After the end of $NOHSO_4$ addition, the reaction mixture was stirred for further 30 minutes. A pale blue coloring was taken by the liquid phase during said last period. 110.1 g. of alpha-chloro-hexanone oxime sulphate, and 11.2 g. of cyclohexene (non-reacted) were obtained. The alpha-chloro-cyclohexanone oxime sulphate showed the same properties as stated in Example 1. A yield of 95.2%, based on the $NOHSO_4$ and on reacted cyclohexene, was obtained. By the same procedure as stated in Example 1, 60.7 g. of alpha-chloro-cyclohexanone oxime, M.P. 73°–74° C. were obtained from such sulphate. The yield, based both on $NOHSO_4$ and on reacted cyclohexene, was therefore 87%. The product, crystallized from petroleum ether, did show an M.P. of 79°–80° C.

*Example 3*

A procedure similar to that stated in the preceding examples was followed, with the exception that 60 g. of $NOHSO_4$ were added to the solution of 50 g. of cyclohexene in 150 g. of acetic acid, while dry HCl was bubbled therethrough. The reaction temperature was initially of +8° C., while toward the end of reaction it was kept at about +3° to 4° C. Now, a homogeneous, clear pale-blue colored solution was obtained, instead of the separation of an oily product. Said solution was diluted with cold water, until no further precipitation took place. The mixture was then extracted with $CH_2Cl_2$.

The anhydrous extract was distilled under vacuum, thereby recovering the acetic acid and the non-reacted cyclohexene. 58 g. of a solid residue were left, which gave after crystallization from petroleum either 52 g. of pure alpha-chloro-cyclohexanone oxime, M.P. 79°–80° C.

*Example 4*

60 g. of $NOHSO_4$ were added, in the course of about 40 minutes and while stirring, to a solution of 40 g. of cyclohexene in 160 g. of $CH_2Cl_2$ kept at 0° C. (molar ratio $NOHSO_4$ : cyclohexene=1:1.03) and at the same time, dry HCl was bubbled therethrough.

Under the above conditions, a single phase, wherein the product is dissolved, was present in the whole course of the reaction. A pale-yellow coloring was taken by the reaction mixture during the addition of reactants and such coloring was maintained up to the end of the test. The bubbling of HCl was continued until all $NO^+$ ions disappeared from the reaction mixture. The total reaction time was of about 1 hr., 30 minutes. During said time, a total of 19 g. of HCl were fed to reaction mixture. The reaction mixture may be either set free from the $CH_2Cl_2$, thereby obtaining the alpha-chlorocyclohexanone oxime sulphate or may be poured into 300 cc. of ice water and stirred for 10–15 minutes. In the latter case, the separated chloromethylene, layer was anhydrified and made dry under vacuum without heating. The solid residue (64.2 g.) consisted of alpha-chloro cyclo-hexanone oxime, with an oxime content of 98% and with an M.P. 77°–78° C. The yield of alpha-chlorocyclohexanone oxime, based on nitrosyl sulphate, was of 90.4%.

*Example 5*

A solution of 30 g. of 2-pentene in 90 g. of cyclohexane was put into a 250 cc., round bottomed flask, equipped with a reflux condenser, a stirrer and a thermometer, formed with two separate inlets for the HCl and the nitrosylsulphuric acid, and immersed in a cooling bath.

The flask contents were cooled down to 0° C., and the feed of nitrosylsulphuric acid, subdivided into minute crystals, was started by means of a metering device suitable for solid substances. Simultaneously gaseous HCl was also fed, in an amount such as to have a slight excess thereof in respect to nitrosylsulphuric acid.

Thus, 44.2 g. of nitrosylsulphuric acid, and about 15 g. of gaseous HCl were added within about 120 minutes.

In the course of the slightly exothermic reaction, the initially brown colored reaction mixture, became more and more pale, and a whitish viscous oil was formed. The end of reaction was indicated by the disappearance of $NO^+$ ion reaction on the iodine-starch paper.

The cyclohexane was removed by decantation, and the oil was extracted with fresh cyclohexane, to recover the whole non-reacted olefine. 5.5 g. of 2 pentene were determined, by titration with bromine, on the cyclohexane extracts.

After the last traces of cyclohexane were removed by suction, 80.3 g. of an oily product were obtained. Such product had the following elemental analysis—

Found: Cl percent=15.10, N percent =6.20, S percent=13.09. Calculated for $C_5H_{10}ClNO \cdot H_2SO_4$: Cl percent=15.17, N percent=5.99, S percent=13.71.

Moreover, the product shows a referavtive index $n_D^{30}=1.4815$.

Such product was treated with water at 0° C., extracted with methylene chloride and dried on dry magnesium sulphate. After the evaporation of solvent 43.5 g. of a liquid residue, having $n_D^{25}=1.4720$, and an elemental analysis as stated below, were left behind.

Found: Cl percent=26.50, N percent=10.90.

By a vacuum distillation, 42.9 g. of a colorless, lachrymatory liquid, having a B.P.=75° C./10 mm. Hg, and an $n_D^{25}=1.4723$, where obtained.

The elemental analysis of such liquid gave the following results—

Found: Cl percent=26.00, N percent=10.5. Calculated for $C_5H_{10}ClNO$: Cl Percent=26.14, N percent=10.33.

The substance proved to be identical with the 3-chloro-pentan-2-one-oxime, as obtained by oximation of the 3-chloro-pentan-2-one.

The chromatographic analysis of the gaseous phase showed that 3-chloro-pentan-2-one-oxime only was present in the product.

The analysis of the I.R. absorption spectrum showed the following characteristic maxima (expressed in microns): 3.07; 6.05; 9.0; 9.25; 9.95; 10.35; 11.1; 12.1; 12.4; 12.8; 13.55; 14.85.

The yield of distilled 3-chloro-pentan-2-one-oxime, based on the reacted 2-pentene, amounted to 90.5%.

Example 6

A procedure similar to that of Example 5 was followed, with the exception that 15 g. of cyclo-pentene were dissolved in 50 g. of cyclohexane.

Then, 24.5 g. of nitrosylsulphuric acid, and 8.5 g. of gaseous HCl were added in the course of 1 hour.

After the end of reactants addition, the mixture was stirred for further 30 minutes, while keeping the temperature thereof at 0° C. After such time, the $NO^+$ ion was wholly disappeared.

After the separation of the cyclohexane phase, and the removal by suction of the last traces of solvent, 43.7 g. of an orange-yellow oily product were left behind. The elemental analysis of such product gave the following results—

Found: Cl percent=15.20, N percent=5.79, S percent=13.50. Calculated for $C_5H_8ClNO \cdot H_2SO_4$: Cl percent=15.30, N percent=6.04, S percent=13.83.

40 g. of the above product, dissolved in methyene chloride, were treated with water at 0° C. The chloromethylene layer was removed, dried on anhydrous magnesium sulphate, and evaporated. 19.8 g. of a crystalline residue of alpha-chloro-cyclo-pentanon-oxime M.P.=48°–50° C. has been obtained. The elemental analysis gave the following results—

Found: Cl percent=25.90, N percent=10.40. Calculated for $C_5H_8ClNO$: Cl percent=26.54, N percent=10.48.

By crystallization from petroleum ether the melting point became 52°–53.5° C.

The analysis of the infrared absorption spectrum showed the following characteristic maxima (in microns): 3.05; 3.18; 8.25; 10.33; 10.58; 11.15; 11.55; 11.92; 12.2; 14.0.

The measurements have been made in a pastille of KBr.

The yield of alpha-chloro-cyclopentanon-oxime, calculated on the nitrosylsulphuric acid was 84%.

Example 7

In the course of 2 hours 26 g. of nitrosylsulphuric acid and about 9 g. of gaseous hydrochloric acid were added, while stirring, to a solution of 28 g. of cyclo-octene in 100 g. of methylene chloride maintaining the temperature at −10° C.

In these conditions, in the course of the reaction, there is a single phase in which the reaction product is dissolved; during the addition of the reactants the solution assumes a pale yellow coloring which is maintained up to the end of the test. When the disappearance of the ion $NO^+$ is ascertained through the test with iodide-starch paper, petroleum ether is added to the reaction mixture until no precipitation of the product is observed. The ether layer was removed, and the unreacted cyclo-octene was determined by means of a titration with bromine; 0.5 g. of non-converted cyclo-octene were found. The last traces of solvent were removed from the precipitated oily product by sucking under vacuum, until constant weight, thereby obtaining 59.1 g. of a viscous product having the hereinafter stated elemental analysis—

Found: Cl percent=13.00, N percent=4.90, S percent=11.60. Calculated for $C_8H_{14}ClNO \cdot H_2SO_4$: Cl percent=12.95, N percent=5.11, S percent=11.71, and showing a refractive index $n_D^{30}=1.5100$.

90.9 g. of the above substance, after having been treated with water at 0° C., gave after extraction with methylene chloride, drying on anhydrous magnesium sulphate, and evaporation, 30.1 g. of alpha-chloro-cyclo-octanone oxime, M.P. 70°–75° C.

The elemental analysis gave the following results—

Found: Cl percent=19.95, N percent=8.02. Calculated for $C_8H_{14}ClNO$: Cl percent=20.18, N percent=7.97.

An increase in the M.P. up to 85°–88° C. was observed after crystallisation from petroleum ether.

The analysis of I.R. absorption spectrum showed the following characteristic maxima (expressed in microns): 3.13; 3.25; 6.06; 9.82; 10.12; 10.23; 10.72; 13.37; 13.88.

The measurement was made in a KBr pastille.

The yield of alpha-chloro cyclo octanone oxime, calculated on the basis of converted cyclo-octene, amounted to 80%.

Example 8

A procedure similar to that as stated in Example 7 was followed, except that a solution of cyclo-octene in cyclohexane, instead of in methylene cloride, was used. Alpha-chloro cyclo-octanone oxime was obtained, with a yield of 90.2%, based on the reacted cyclo-octene.

Example 9

Equipment similar to that of preceding examples was utilized.

A solution of 23.6 g. of cyclododecene in 80 g. of methylene chloride was put into the round bottomed flask. Then, while stirring, and keeping the temperature at 0° C., 14.7 g. of nitrosylsulphuric acid and 5 g. of gaseous HCl were added, within two hours, to said solution.

At the end of reactants addition, the solution appeared orange colored. The stirring was continued until the complete disappearance of $NO^+$ ion (test with the iodine-starch paper).

The reaction product was precipitated with petroleum ether, and the last traces of solvent were removed under suction, from the separated oily product, until a constant-weight 35 g. of a red-brown, pasty product were obtained. The elemental analysis thereof gave the following results—

Found: Cl percent=10.09, N percent=4.50, S percent=10.35. Calculated for $C_{12}H_{22}ClNO \cdot H_2SO_4$: Cl percent=10.74, N percent=4.24, S percent=9.71.

By a treatment with water at 0° C., a separation took place of crystalline alpha-chloro-cyclododecanone-oxime which, after filtering, washing with cold water and drying in vacuum, weighed 19.6 g., and showed an M.P. 131°–132.5° C.

The elemental analysis gave the following results—

Found: Cl percent=15.31, N percent=6.02. Calculated for $C_{12}H_{22}ClNO$: Cl percent=15.29, N percent=6.04.

The analysis of I.R. absorption spectrum showed the following characteristic maxima (expressed in microns): 3.05; 3.18; 10.16; 10.5; 10.8; 11.95; 12.2; 12.7; 13.16; 14.47.

The yield of alpha-chloro-cyclododecanone-oxime, based on the nitrosylsulphuric acid, amounted to 74%.

Example 10

An apparatus similar to that stated in the preceding examples was utilized.

20 g. of 1-heptene, dissolved in 60 g. of cyclohexane, were put into the reaction vessel. Then, while stirring and keeping the temperature at 0° C., 22 g. of nitrosylsulphuric acid and 7.5 g. of gaseous HCl were added to said solution within one hour. The stirring was continued for further 3 hrs., after which the complete disappearance of NO+ ion was ascertained (test with the iodide-starch paper).

The cyclohexane was decanted, washing then the oily layer with fresh cyclohexane, to recover the whole non-reacted olefine. 7.2 g. of non-reacted 1-heptene were determined on the cyclohexane extracts by titration with bromine. The last traces of solvents were sucked-off under vacuum, thereby obtaining 40.5 g. of a pale yellow colored oily substance, which was then treated with water at 0° C. The resulting mixture was extracted with methylene chloride, and the chloromethylene extracts were put together, dried on anhydrous magnesium sulphate and evaporated. 19.2 g. of a yellow oil were left back as residue.

By the distillation of such a residue, 18.5 g. of alpha-chloro-henantaldehyde oxime were obtained under the form of a colorless liquid, B.P.=66°–68° C./0.5 mm. Hg, and $n_D^{20}$=1.4658. The yield of distilled alpha-chloro-henantaldehyde oxime, based on the reacted olefine, amounted to 86.7%.

What we claim is:

1. A process for obtaining a compound selected from the group which consists of alpha-chloro-aldoximes and alpha-chloro-ketoximes, which comprises: reacting an organic olefinic compound having the structural formula:

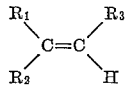

wherein $R_1$, $R_2$, $R_3$ represent organic substituents selected from the group which consists of hydrogen atoms, alkyl, cycloalkyl, phenyl, and phenylalkyl radicals, and members of a ring compound bridged by $CH_2$ groups to form a cycloaliphatic ring having from four to twelve carbon atoms, with nitrosylsulphuric acid, in the presence of anhydrous hydrogen chloride to form a reaction mixture and thereby obtain the corresponding alpha-chloro-oxime sulphate and treating said sulphate with water to convert it into the corresponding free alpha-chloro oxime.

2. A process as defined in claim 1 wherein the organic olefinic compound is reacted with the nitrosylsulphuric acid in the presence of an inert organic solvent in which the alpha-chloro-oxime sulphate is soluble, said solvent being selected from the group which consists of acetic acid, propionic acid, nitrobenzene and methylene chloride.

3. A process as defined in claim 1 wherein at least one mole of said olefinic compound and at least one mole of anhydrous hydrogen chloride are reacted with substantially each mole of nitrosylsulphuric acid.

4. A process as defined in claim 1 wherein said olefinic compound is contained within a reaction vessel and the hydrogen chloride and the nitrosylsulphuric acid are metered simultaneously into said vessel.

5. A process as defined in claim 1 wherein the entire amount of hydrogen chloride is present when the reaction is started.

6. A process according to claim 1 wherein the hydrogen chloride is gradually formed within the reaction medium during the course of the reaction.

7. A process as defined in claim 1, wherein the reaction between the organic compound containing the olefinic bond, and the nitrosylsulphuric acid, in the presence of anhydrous hydrogen chloride is carried out at a temperature ranging from about −30° to +30° C.

8. A process as defined in claim 7, wherein said temperature is on the order of 0° C.

9. A process as defined in claim 1 wherein the reaction between the organic olefinic compound and the nitrosylsulphuric acid is carried out in the presence of an inert organic solvent, in which the alpha-chloro-oxime sulphate is insoluble, said solvent being selected from the group which consists of hexane, cyclohexane, an excess of said organic compound, benzene, toluene and carbon tetrachloride.

10. A process for obtaining a compound selected from the group which consists of alpha-chloro-aldoximes and alpha-chloro-ketoximes, which comprises: reacting an organic olefinic compound having the structural formula:

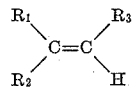

wherein $R_1$, $R_2$, $R_3$ represent organic substituents selected from the group which consists of hydrogen atoms, alkyl, cycloalkyl, phenyl, and phenylalkyl radicals and members of a ring compound bridged by $CH_2$ groups to form a cycloaliphatic ring having from four to twelve carbon atoms with nitrosylsulphuric acid, in the presence of anhydrous hydrogen chloride to form a reaction mixture and thereby obtain the corresponding alpha-chloro-oxime sulphate; separating said sulphate from the reaction mixture; and treating the separated sulphate with water to convert it into the corresponding alpha-chloro oxime.

11. A process for obtaining a compound selected from the group which consists of alpha-chloro-aldoximes and alpha-chloro-ketoximes, which comprises: reacting an organic olefinic compound having the structural formula:

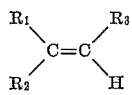

wherein $R_1$, $R_2$, $R_3$ represent organic substituents selected from the group which consists of hydrogen atoms, alkyl, cycloalkyl, phenyl, and phenylalkyl radicals, and members of a ring compound bridged by $CH_2$ groups to form a cycloaliphatic ring having from four to twelve carbon atoms, with nitrosylsulphuric acid, in the presence of anhydrous hydrogen chloride to form a reaction mixture and thereby obtain the corresponding alpha-chloro-oxime sulphate.

12. A process as defined in claim 11 wherein said organic olefinic compound is selected from the group which consists of cyclohexane, pentene, cyclopentene, cyclooctene, cyclododecene and heptene.

References Cited by the Examiner

UNITED STATES PATENTS

| | | | |
|---|---|---|---|
| 2,890,248 | 6/1959 | Craig | 260—566 |
| 3,078,306 | 2/1963 | Schickh et al. | 260—566 |

FOREIGN PATENTS

| | | |
|---|---|---|
| 534,633 | 12/1956 | Canada. |
| 1,220,685 | 1/1960 | France. |

OTHER REFERENCES

Adams et al., "Organic Reactions," vol. VII, pages 327–330 (1953).

Ephraim, "Inorganic Chemistry," Fourth Edition, p. 683 (1943).

Schmidt et al., Ber. Deut. Chem., vol. 37, pp. 534–533 (1904).

Thorne, J. Chem. Soc. (London), volume of 1956, pp. 2587–2589.

CHARLES B. PARKER, *Primary Examiner.*

FLOYD HIGEL, *Assistant Examiner.*